US006073325A

United States Patent [19]

Stark

[11] Patent Number: 6,073,325

[45] Date of Patent: Jun. 13, 2000

[54] QUICK-ACTION CLAMPING CYLINDER WITH FLUID OUTLET

[76] Inventor: Emil Stark, Kommingerstr. 48, A-6840 Götzis, Austria

[21] Appl. No.: 09/023,628

[22] Filed: Feb. 13, 1998

[30] Foreign Application Priority Data

Feb. 14, 1997 [DE] Germany ........................... 297 02 577

[51] Int. Cl.[7] ........................................ B23Q 3/02

[52] U.S. Cl. ....................... 29/33 P; 198/345.3; 269/309; 409/225

[58] Field of Search ............................ 29/33 P; 269/309; 198/345.3, 345.2; 409/134, 219, 225, 172, 174; 408/70, 87

[56] References Cited

U.S. PATENT DOCUMENTS

| | | | |
|---|---|---|---|
| 4,356,904 | 11/1982 | Siarto | 198/345.3 |
| 4,662,043 | 5/1987 | Stone et al. | 29/33 P |
| 5,065,991 | 11/1991 | Schneider | 269/309 |
| 5,167,405 | 12/1992 | Cayley, Jr. | 269/309 |
| 5,184,810 | 2/1993 | Lebrecht | 29/33 P |
| 5,415,384 | 5/1995 | Obrist et al. | 269/309 |
| 5,743,687 | 4/1998 | Ribic et al. | 409/225 |
| 5,810,344 | 9/1998 | Nishimoto | 269/309 |

FOREIGN PATENT DOCUMENTS

| | | |
|---|---|---|
| 0 291 482 | 5/1988 | European Pat. Off. . |
| 33 47 423 A1 | 7/1985 | Germany . |
| 35 18581 A1 | 11/1986 | Germany . |
| 3429 176 C2 | 4/1987 | Germany . |
| 44 07 800 A4 | 9/1995 | Germany . |

OTHER PUBLICATIONS

Search report—Germany—dated Jun. 25, 1997.

*Primary Examiner*—Daniel W. Howell
*Attorney, Agent, or Firm*—Fulbright & Jaworski L.L.P.

[57] ABSTRACT

An arrangement for releasable attachment of workpieces to be machined on a processing machine with a pallet, on which the workpieces are releasably attached and can be releasably linked via this pallet with the processing machine, whereby the lock between the pallet and the processing machine is accomplished with at least one insertion pin attached to the pallet, which pin engages respectively in a seat of a quick-action clamping cylinder, whereby the seating opening (11) for the insertion pin (5) provided on the quick-action clamping cylinder (1) is provided with an outlet (28).

5 Claims, 3 Drawing Sheets

QUICK-ACTION CLAMPING CYLINDER WITH FLUID OUTLET

The object of the present innovation is an arrangement according to the generic part of claim 1. which is frequently also referred to as a quick-action clamping cylinder.

Such quick-action clamping cylinders are known in various embodiments. All these embodiments have in common the fact that one or a plurality of insertion pins are applied to a pallet. These insertion pins are introduced into the quick-action clamping cylinder and held there by appropriate technical means, which are not a focus of this application.

Usually, these quick-action clamping cylinders are sealed on the bottom.

During the cutting of workpieces which are attached to pallets, which are in turn attached to a processing machine, in some cases not all the quick-action clamping cylinders present are used. The result is that these quick-action clamping cylinders can become contaminated in the region of their seating opening for the insertion pins; in particular it is possible for the cutting oil as well as chips to collect in the seating opening.

Then, when an insertion pin is to be seated in such a contaminated seating opening, this seating is obstructed by the cutting oil and, possibly, the chips. In fact, as a rule, a reliable seating is possible; however, the oil is forced out of the seating opening by the entering insertion pin and contaminates the surrounding area. Injuries may even occur if, for example, the oil hits an operator in the eyes.

Moreover, if there are chips in the seating opening, the danger exists that these chips may collect between the insertion pin and associated holding parts of the quick-action clamping cylinder and damage these components.

There are also different designs of quick-action clamping cylinder described more thoroughly in the following in which operational safety can be jeopardized by the retention of the cutting oil in the seating opening.

The object of the present innovation is, consequently, to improve an arrangement of the type mentioned in the introduction such that it operates more reliably and reduces, if not completely eliminates, the danger of contamination and injury.

This object is achieved according to the innovation through the technical teaching of claim 1.

The idea of the innovation consists in providing the seating opening for the insertion pin with an outlet.

By providing such an outlet, the penetration of a cutting oil along with chips into the seating opening is not actually prevented; however, it is ensured that only minimal amounts can collect in the seating opening. The quick-action clamping cylinder then operates without problems despite contamination by the cutting oil, essentially as well as in the completely dry state.

This outlet is preferably installed such that the cutting oil can drain downward under the effect of gravity. If the quick-action clamping cylinder is mounted on an essentially plane surface, it may also be provided on its bottom with one or a plurality of grooves to enable such drainage. The outlet itself may be formed simply as an extension of the seating opening for the insertion pin.

In this seating design, an empty space through which the insertion pin does not extend also is formed. A certain quantity of chips may collect in this empty space before the operational safety of the quick-action clamping cylinder is impaired.

In various applications, it may be impossible to provide downward drainage. In this case the outlet may be designed in the form of one or a plurality of holes such that they are located on the side of the quick-action clamping cylinder.

In an improvement of the present innovation, provision is made to seal the seating opening of the quick-action clamping cylinder designed as a central bore against other parts of the quick-action clamping cylinder, in particular against tension springs and/or hydraulic pistons. As a result of this seal, the aforementioned components cannot come into contact with the cutting oil; thus they cannot become contaminate and nor can they rust.

In addition, it is also possible to use one or a plurality of tension springs to lock or insert the insertion pins in the quick-action clamping cylinder and one or a plurality of hydraulic cylinders to open or to release the locking. When cutting oil collects in the space provided for this in the quick-action clamping cylinder, this cutting oil acts as a pressure cushion against the action of the hydraulic pistons. Then, high pressure must be applied to release the lock, which represents on the one hand, an unnecessary waste of energy and, on the other, can result in damage to the quick-action clamping cylinder because of the high pressure which is present.

The inventive object of the present innovation results not only from the object of the individual claims, but also from the combination of the individual claims with each other.

All data and characteristics disclosed in the documents, including the abstract, and in particular the physical design depicted in the drawings are claimed as essential to the invention, to the extent that they are innovative individually or in combination compared to the prior art.

In the following the innovation is explained in detail with reference to a drawing depicting only one embodiment. The drawing and its description reveal additional characteristics and advantages essential to the invention.

Figure 1A:
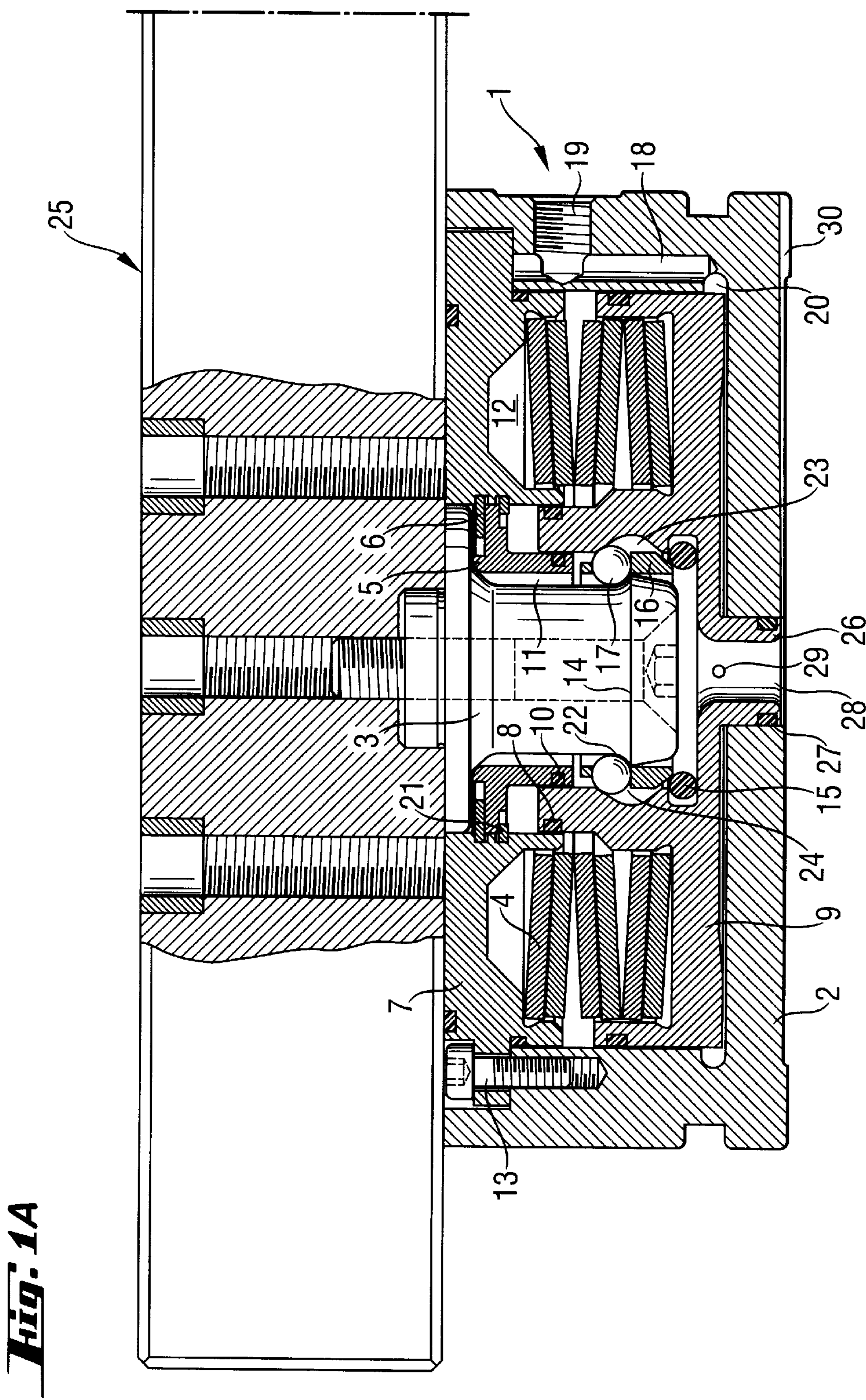
FIG. 1A is a cross sectional view showing the insertion pin being restrained.
Figure 1B:
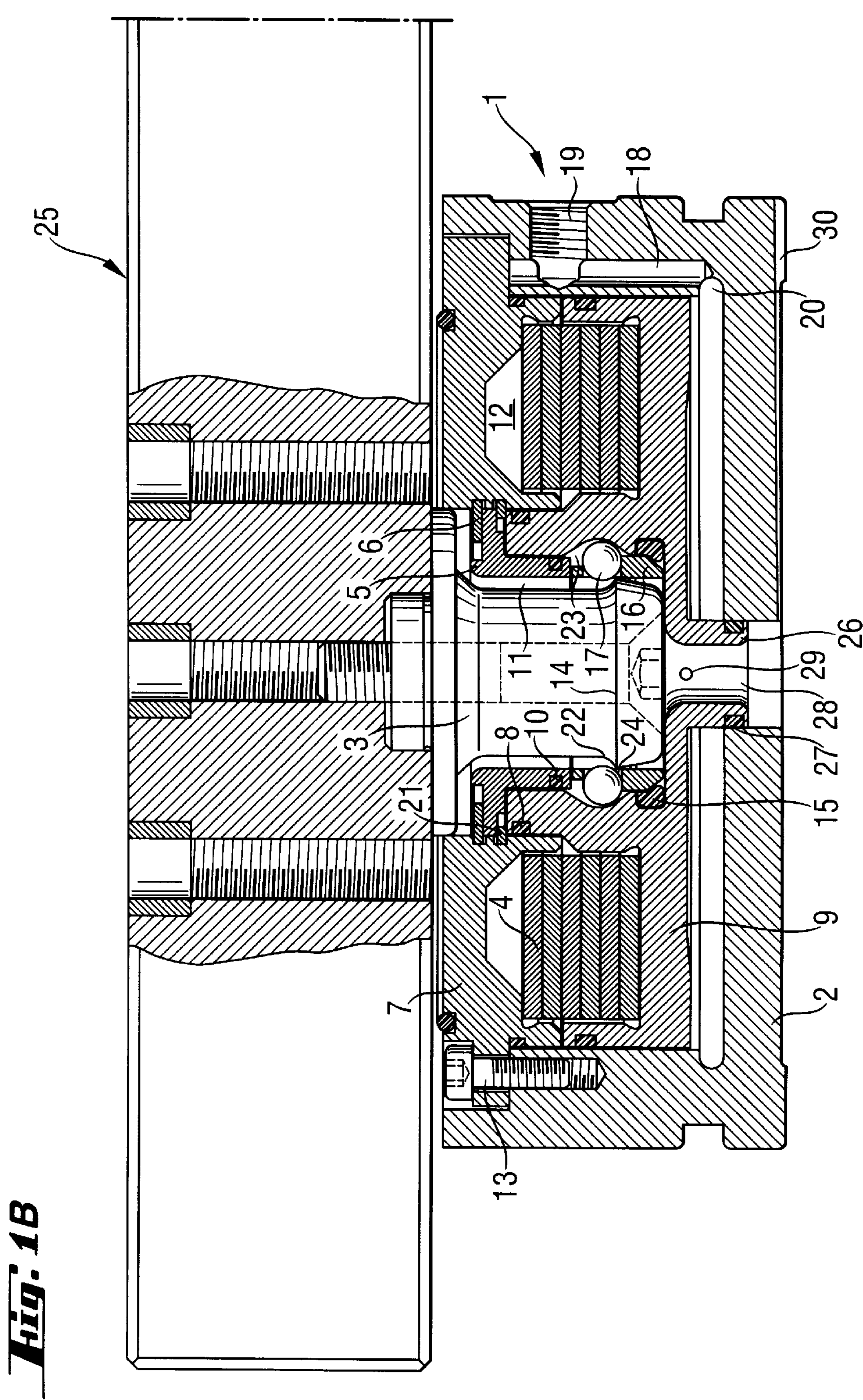
FIG. 1B is a cross sectional view showing the insertion pin in a released position.
Figure 1C:
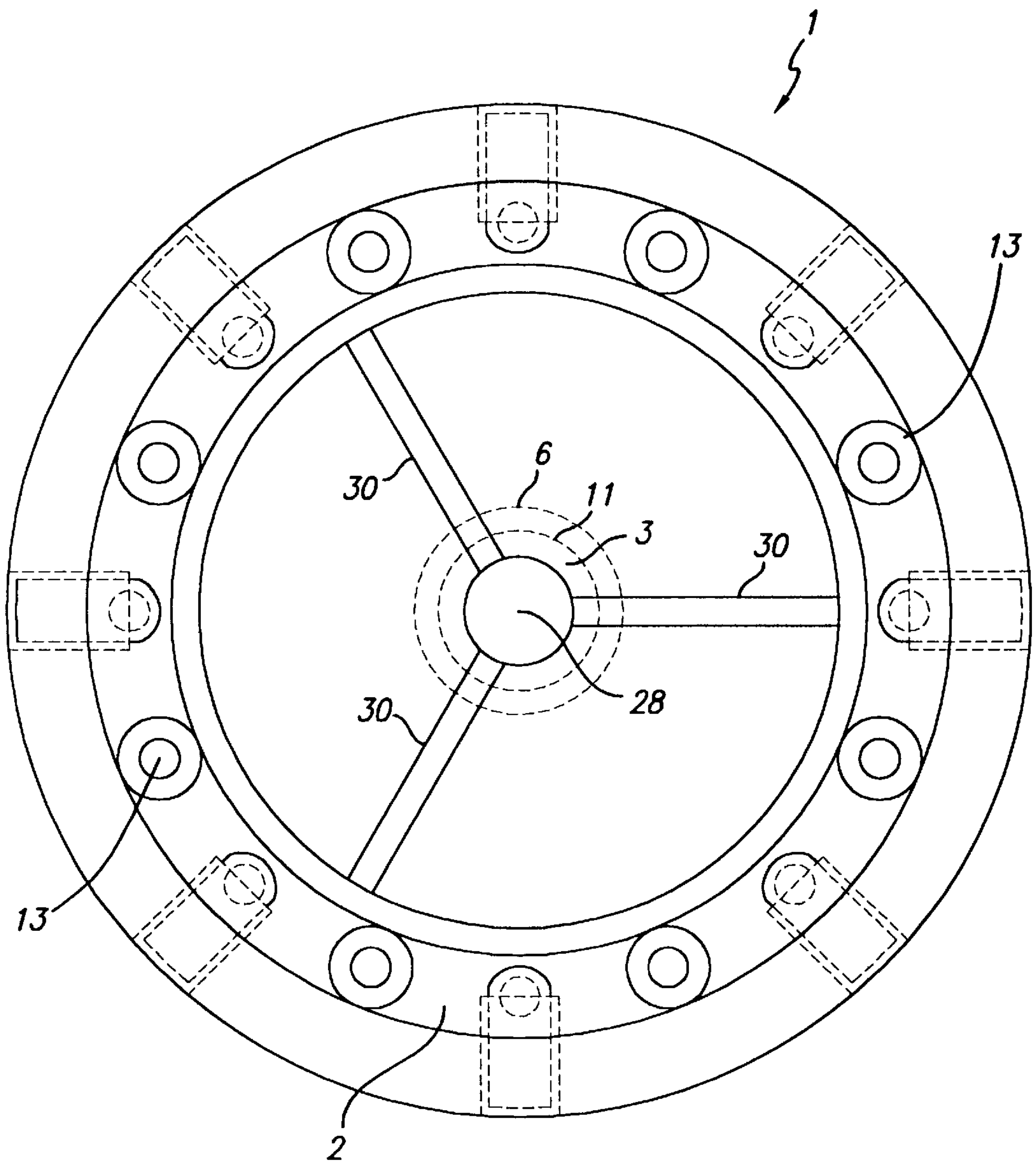
FIG. 1C is a bottom view showing the drainage grooves.

A quick-action clamping cylinder 1, which has an essentially plate-shaped bottom part 2, is provided. A hydraulic piston 9 is displaceably accommodated in the bottom part 2. The quick-action clamping cylinder 1 is covered on the top with a cover 7, which is attached to the bottom part 2 by a plurality of screws 13. There is one or a plurality of tension springs in the space 12 between the hydraulic cylinder 9 and the cover 7.

When the insertion pin 3 is introduced into the central bore 11, it is pulled downward and locked there due to the action of the tension springs 4.

The locking is achieved by means of balls 17, which are mounted in a ball cage 16. The ball cage 16 is braced against the hydraulic piston 9 by means of an O-ring 15. The balls 17 are then accommodated in an annular space 24 of the ball cage 16.

In the clamped position (left half of the figure), the balls 17 are in contact with the annular groove 22 disposed in the outer periphery of the insertion pin 3. At the same time, the balls 17 lie with a part of their outer periphery against a slope in the region of the annular groove 23 of the hydraulic piston 9. If the hydraulic piston 9 is now pressed downward by the elastic force of the tension springs 4, the balls 17 are carried along downward over the slopes, press the ball cage 16 against the O-ring 15, and pull the insertion pin 3 downward as well.

For the release or unlocking, a pressure chamber 20, which is located between the hydraulic piston 9 and the bottom part 2 of the quick-action clamping cylinder, is acted on by an oil supply device 19 and a supply line 18. This pushes the hydraulic piston 9 upward. This movement applies force to the O-ring 15, which pushes the ball cage 16 upward. With continuing upward displacement of the hydraulic piston 9, the balls 17 reach the region of the radially outward annular groove 23 of the hydraulic piston 9, whereby they simultaneously lose contact with the radially inward annular groove 22 of the insertion pin 3. This unlocks the insertion pin 3 attached to a perforated pallet.

A gasket 5 is provided to seal off the space 12 between the hydraulic piston 9 and the cover 7, in which the tension springs 4 are seated. This gasket 5 is mounted immovably on the cover 7 by means of circlips 6, 21 and sealed by an O-ring 10 against the bottom part 2. This bottom part 2 is in turn sealed against the cover 7 by an additional O-ring 8.

By means of this sealing arrangement, it is ensured that no cutting oil can penetrate into the space 12. This cutting oil could result, in the one hand, in corrosion of the springs, and, on the other hand, the action of the hydraulic piston 9 would be impaired. Provision is made now according to the innovation to extend the central bore 11 downward in order to thus produce a outlet opening 28. To ensure the sealing action, the hydraulic piston 9 is extended by a shoulder 26 and sealed against the outlet opening 28 by an O-ring 27. When the quick-action clamping cylinder 1 is seated on a plane surface, one or a plurality of drainage grooves 30, which facilitate the escape of the cutting oil, are also provided on the bottom part 2.

Provision may also be made to have the outlet at the point 29 and to provide one or a plurality of holes for this.

Overall, with the object of the present innovation, an extremely reliable clamping of the insertion pins in the quick-action clamping cylinder.

DRAWINGS LEGEND

1. Quick-action clamping cylinder
2. Bottom part
3. Insertion pin
4. Tension spring
5. Gasket
6. Circlip
7. Cover
8. O-ring
9. Hydraulic piston
10. O-ring
11. Central bore
12. Space
13. Screw
14. Annular flange
15. O-ring
16. Ball cage
17. Ball
18. Supply line
19. Oil supply device
20. Pressure chamber
21. Circlip
22. Groove
23. Groove
24. Annular space
25. Perforated pallet
26. Shoulder
27. O-ring
28. Outlet opening
29. Position
30. Drainage groove

What is claimed is:

1. An arrangement for releasable attachment of workpieces to be machined on a processing machine with a pallet, on which the workpieces are releasably attached and can be releasably linked via this pallet with the processing machine, whereby the lock between the pallet and the processing machine is accomplished with at least one insertion pin attached to the pallet, which pin engages respectively in a seating opening (11) of a quick-action clamping cylinder, characterized in that the seating opening (11) for the insertion pin (3), provided on the quick-action clamping cylinder (1), is provided with an outlet (28).

2. The arrangement according to claim 1, characterized in that the seating opening (11) is designed as a central bore, sealed by means of sealing (5, 8, 10, 27) against the space (12) of the quick-action clamping cylinder (1), in which tension springs (4) are seated.

3. The arrangement according to claim 2, characterized in that, for sealing the seating opening (11) against the space (12) of the quick-action clamping cylinder (1), a gasket (5) of the sealing means is provided with the sealing elements (8,10).

4. The arrangement according to one of the preceding claims, characterized in that for sealing the seating opening (11) against the space (12) of the quick-action clamping cylinder (1), the outlet (28) of the seating opening (11) is sealed by means of a sealing element (27).

5. The arrangement according to claim 1, characterized in that a bottom part (2) of the quick-action clamping cylinder (1) is provided with one or a plurality of radial grooves (30).

* * * * *